US008385177B2

(12) United States Patent
Ejima

(10) Patent No.: US 8,385,177 B2
(45) Date of Patent: *Feb. 26, 2013

(54) CONTENT TRANSMITTING APPARATUS FOR TRANSMITTING CONTENT WITH COPY CONTROL INFORMATION, CONTENT IDENTIFICATION INFORMATION AND CONTENT STATUS INFORMATION

(75) Inventor: Naoki Ejima, Osaka (JP)

(73) Assignee: Panasonic Corporation, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/413,418

(22) Filed: Mar. 6, 2012

(65) Prior Publication Data
US 2012/0163149 A1 Jun. 28, 2012

Related U.S. Application Data

(63) Continuation of application No. 10/585,947, filed as application No. PCT/JP2005/003818 on Feb. 28, 2005, now Pat. No. 8,194,519.

(30) Foreign Application Priority Data

Mar. 29, 2004 (JP) ................................ 2004-096714

(51) Int. Cl.
G11B 20/10 (2006.01)
(52) U.S. Cl. ........................................... 369/84; 726/31
(58) Field of Classification Search .................. None
See application file for complete search history.

(56) References Cited

U.S. PATENT DOCUMENTS

| 6,272,286 | B1 | 8/2001 | Asada et al. |
| 6,615,192 | B1 | 9/2003 | Tagawa et al. |
| 6,748,485 | B1 | 6/2004 | Yokota et al. |
| 6,836,844 | B1 | 12/2004 | Kori et al. |
| 6,978,377 | B1 | 12/2005 | Asano et al. |
| 7,010,687 | B2 | 3/2006 | Ichimura |
| 7,159,244 | B2 | 1/2007 | Matsushima et al. |
| 8,194,519 | B2 * | 6/2012 | Ejima ............................ 369/84 |

FOREIGN PATENT DOCUMENTS

| EP | 0 878 794 A2 | 11/1998 |
| EP | 0 924 930 A2 | 6/1999 |
| EP | 1 056 092 A1 | 11/2000 |
| EP | 1 067 789 A1 | 1/2001 |

(Continued)

OTHER PUBLICATIONS

Japanese Office Action issued in Japanese Patent Application No. 2004-096714, mailed Jan. 19, 2010.

(Continued)

Primary Examiner — Hoa T Nguyen
Assistant Examiner — Mark Fischer
(74) Attorney, Agent, or Firm — McDermott Will & Emery LLP

(57) ABSTRACT

A content transmitting apparatus and the like which execute copy control of content more securely than conventional, and can count copy number correctly according to the situation, even in the case where content transfer is interrupted are provided. The content reproducing apparatus 10 for transmitting content that is digital copyrighted work including a plurality of content blocks comprises: the content reproducing unit 11 which reads out content and the like from the DVD 30; the control unit 12 which repeats, for each of the plurality of content blocks, transmitting in parallel with the content blocks, the copy control information indicating copy permission of the content, the content identification information identifying content, and the content status information indicating status of the content blocks in the overall content; the data building unit 15; the transmission unit 16; and the like.

1 Claim, 8 Drawing Sheets

FOREIGN PATENT DOCUMENTS

| | | |
|---|---|---|
| EP | 1 081 616 A2 | 3/2001 |
| EP | 1 096 499 A2 | 5/2001 |
| JP | 10-322648 | 12/1998 |
| JP | 11-176091 | 7/1999 |
| JP | 2000-339851 | 12/2000 |
| JP | 2001-086444 | 3/2001 |
| JP | 2001-125833 A | 5/2001 |
| JP | 2003-134456 A | 5/2003 |
| JP | 2004-30586 A | 1/2004 |
| JP | 2004-152014 A | 5/2004 |
| KR | 10-2002-0027482 | 4/2002 |
| WO | WO 01/05148 A1 | 1/2001 |

OTHER PUBLICATIONS

European Examination Report issued in European Patent Application No. EP 05 720 090.9, dated Sep. 4, 2009.

* cited by examiner

FIG. 8A

| | 7 | 6 | 5 | 4 | 3 | 2 | 1 | 0 | |
|---|---|---|---|---|---|---|---|---|---|
| HB0 | Packet type="05" | | | | | | | | Header |
| HB1 | ISRC_Cont | ISRC_Valid | | res | | ISRC Status(Content status information) | | | |
| HB2 | res | | | | | | | | |
| PB0 | UPC_EAN_ISRC_00 | | | | | | | | |
| PB1 | UPC_EAN_ISRC_01 | | | | | | | | |
| PB2 | UPC_EAN_ISRC_02 | | | | | | | | |
| PB3 | UPC_EAN_ISRC_03 | | | | | | | | |
| PB4 | UPC_EAN_ISRC_04 | | | | | | | | |
| PB5 | UPC_EAN_ISRC_05 | | | | | | | | |
| PB6 | UPC_EAN_ISRC_06 | | | | | | | | |
| PB7 | UPC_EAN_ISRC_07 | | | | | | | | |
| PB8 | UPC_EAN_ISRC_08 | | | | | | | | ISRC (Content ID) |
| PB9 | UPC_EAN_ISRC_09 | | | | | | | | |
| PB10 | UPC_EAN_ISRC_10 | | | | | | | | |
| PB11 | UPC_EAN_ISRC_11 | | | | | | | | |
| PB12 | UPC_EAN_ISRC_12 | | | | | | | | |
| PB13 | UPC_EAN_ISRC_13 | | | | | | | | |
| PB14 | UPC_EAN_ISRC_14 | | | | | | | | |
| PB15 | UPC_EAN_ISRC_15 | | | | | | | | |

PB16~PB19 reserved

FIG. 8B

| | 7 | 6 | 5 | 4 | 3 | 2 | 1 | 0 | |
|---|---|---|---|---|---|---|---|---|---|
| HB0 | Packet type="06"(next ISRC) | | | | | | | | Header |
| HB1 | | | | res | | | | | |
| HB2 | res | | | | | | | | |
| PB0 | UPC_EAN_ISRC_16 | | | | | | | | |
| PB1 | UPC_EAN_ISRC_17 | | | | | | | | |
| PB2 | UPC_EAN_ISRC_18 | | | | | | | | |
| PB3 | UPC_EAN_ISRC_19 | | | | | | | | |
| PB4 | UPC_EAN_ISRC_20 | | | | | | | | |
| PB5 | UPC_EAN_ISRC_21 | | | | | | | | |
| PB6 | UPC_EAN_ISRC_22 | | | | | | | | |
| PB7 | UPC_EAN_ISRC_23 | | | | | | | | |
| PB8 | UPC_EAN_ISRC_24 | | | | | | | | ISRC (Content ID) |
| PB9 | UPC_EAN_ISRC_25 | | | | | | | | |
| PB10 | UPC_EAN_ISRC_26 | | | | | | | | |
| PB11 | UPC_EAN_ISRC_27 | | | | | | | | |
| PB12 | UPC_EAN_ISRC_28 | | | | | | | | |
| PB13 | UPC_EAN_ISRC_29 | | | | | | | | |
| PB14 | UPC_EAN_ISRC_30 | | | | | | | | |
| PB15 | UPC_EAN_ISRC_31 | | | | | | | | |

PB16~PB19 reserved

CONTENT TRANSMITTING APPARATUS FOR TRANSMITTING CONTENT WITH COPY CONTROL INFORMATION, CONTENT IDENTIFICATION INFORMATION AND CONTENT STATUS INFORMATION

RELATED APPLICATIONS

This application is a Continuation of U.S. application Ser. No. 10/585,947, filed on Jul. 11, 2006, now U.S. Pat. No. 8,194,519, which is the U.S. National Phase under 35 U.S.C. §371 of International Application No. PCT/JP2005/003818, filed on Feb. 28, 2005, which in turn claims the benefit of Japanese Application No. 2004-096714, filed on Mar. 29, 2004, the disclosures of which applications are incorporated by reference herein.

TECHNICAL FIELD

The present invention relates to a content transmitting apparatus and a content receiving apparatus, in particular, to a content transmitting apparatus and a content receiving apparatus used for copying digital copyrighted work.

BACKGROUND ART

With the appearance of mass recording media such as a DVD, by reproducing, using a reproducing apparatus such as a DVD player, a recording medium in which content such as video and music are recorded, it has become possible to enjoy video and music for a long period of time. However, from the standpoint of copyright protection, it is necessary to restrict actions to copy the above mentioned content, as digital data, into other recording media such as a CD-R.

Conventionally, as a technique regarding the above mentioned copy control of content, various methods have been suggested (for example, "Record Reproducing System" as disclosed in Japanese Laid-Open publication No. 2001-125833, and the like).

In the above mentioned conventional record reproducing system, when content is recorded in a recording medium, identification information which identifies whether the content is a copied record from a mass recording medium or a moving record is also recorded. When reproducing, according to the identification information, copy permission is judged, and copying the content and the like are properly permitted or prohibited. Also, based on copy permission number, content copying is monitored, and copying up to a certain number of times is permitted.

However, in the above mentioned conventional record reproducing system, when copying content, the method for reading out, only once, and judging the identification information indicating whether the content is a copied record or the moving record is used. Thus, it cannot be said that a sufficiently secure copy control is executed. For example, when the identification information is read out from the recording medium, in the case where the identification information is captured on the transmission path, and replaced with other information, the copy control becomes invalid. In other words, there is a problem that if the important copy control information indicating copy limitation is modified once, copying becomes possible with the unit of content or recording medium.

Moreover, in the above mentioned conventional record reproducing system, the copy control is executed based on the copy permission number. However, there is a problem that since the case where the content transmission is interrupted and the like are not taken into account, the copy number control is incomplete. For example, in the case where the copy number is counted in the head part of copying, one copy is counted even if a complete copy is not finished. Thus, the user suffers the disadvantage. On the contrary, in the case where the copy number is counted in the end of copying, even if the copy is almost completed, one copy is not counted. Thus, unauthorized copying can be repeated.

DISCLOSURE OF INVENTION

The object of the present invention, in view of the above mentioned problems, is to provide a content transmitting apparatus, a content receiving apparatus and the like which can execute copy control of content more securely than conventional, and can count the copy number correctly according to the situation, even in the case where the content transfer is interrupted.

In order to achieve the above mentioned object, the content transmitting apparatus according to the present invention is a content transmitting apparatus which transmits content that is digital copyrighted work including a plurality of content blocks, the apparatus comprising a synchronous transmitting unit operable to repeat transmitting, for each of the plurality of content blocks, in parallel with said each of the content blocks, copy control information indicating copy permission of the content, content identification information identifying the content, and content status information indicating status of said each of the content blocks in the overall content. Thus, in the copy destination apparatus, for each of the plurality of content blocks, copy permission judgment is repeated based on the copy control information. And, the more secure copy control than conventional can be executed. Moreover, in the case where identification of the content identification information across one content can be maintained, and it is confirmed that each unit of the content has been transferred, one copy is counted. Thereby, even in the case where the content transfer is interrupted, the copy number is counted correctly, according to the situation.

Here, the content transmitting apparatus may further comprise a validity flag generating unit operable to generate a validity flag indicating whether or not the content identification information read out from the recording medium is valid data, wherein said synchronous transmitting unit transmits the content identification information accompanied by the validity flag. For example, the validity flag generating unit may judge whether or not read-out mode of the recording medium used by said read-out unit is special reproduction, and in the case where the read-out mode is the special reproduction, said validity flag generating unit may generate a validity flag indicating that the content identification information is invalid. The content identification information may include a data sequence made of a plurality of data, and said validity flag generating unit may judge whether or not the data sequence made of a plurality of data has been completely read out from the recording medium by said read-out unit, and may generate the validity flag based on the result. Thus, in the copy destination apparatus, only by checking the validity flag, it can be immediately known that the content identification information has not been completely read out, that is, that since a complete content cannot be transferred, copying needs not be prohibited.

Also, in order to achieve the above mentioned object, the content receiving apparatus according to the present invention is the content receiving apparatus which receives, from outside, content that is digital copyrighted work including a plurality of content blocks, and records the content into a recording medium, wherein the plurality of content blocks are sequentially transmitted, each of said content blocks being accompanied by the copy control information indicating copy permission of the content, the content identification information identifying the content, and the content status information indicating status of said each of the content blocks in the overall content, and the content receiving apparatus comprises: a receiving unit operable to receive said each of the content blocks, the copy control information, the content identification information and the content status information; and a recording unit operable to record the content indicated by the content identification information into the recording medium based on the content status information within a range that does not exceed the copy permission number, in the case where the copy control information indicates that the copy permission number is limited. Thus, the copy permission judgment is repeated, for said each of the plurality of content blocks, based on the copy control information. And, a more secure copy control than conventional can be executed. Moreover, in the case where identification of the content identification information across one content can be maintained, and it is confirmed that each unit of the content has been transferred, one copy is counted. Thereby, even in the case where the content transfer is interrupted, the copy number is counted correctly, according to the situation.

The present invention can not only be realized as the above mentioned content transmitting apparatus and content receiving apparatus, but also as a content transmitting method, a content receiving method, a program causing a computer to execute the methods, and a recording medium where a control block including the copy control information, content identification information and content status information is recorded. Needless to say, the program can be distributed via a transmission medium such as Internet and a recording medium such as a DVD.

According to the present invention, in the content transmission, the copy permission judgment is repeated, for said each of the plurality of content blocks, based on the copy control information. And, a more secure copy control than conventional can be executed. Moreover, in one content transmission, in the case where identification of the content identification information across one content can be maintained, and it is confirmed that each unit of the content has been transferred, one copy is counted. Thereby, even in the case where the content transfer is interrupted, the copy number is counted correctly, according to the situation.

Consequently, according to the present invention, copy right in copying digital copyrighted work can be certainly protected, and an adequate copy number control can be realized. Therefore, the practical value of the present invention is extremely high in present day when information digitalization and capacity increase of recording media are being developed.

FURTHER INFORMATION ABOUT TECHNICAL BACKGROUND TO THIS APPLICATION

The disclosure of Japanese Patent Application No. 2004-096714 filed on Mar. 29, 2004 including specification, drawings and claims is incorporated herein by reference in its entirety.

BRIEF DESCRIPTION OF DRAWINGS

These and other objects, advantages and features of the invention will become apparent from the following description thereof taken in conjunction with the accompanying drawings that illustrate a specific embodiment of the invention. In the Drawings:

FIG. 8A and FIG. 8B are diagrams showing the structures of other control packets for music content recorded in a DVD.

BEST MODE FOR CARRYING OUT THE INVENTION

Hereinafter, the embodiment according to the present invention will be explained in detail using the drawings.

Figure 1:
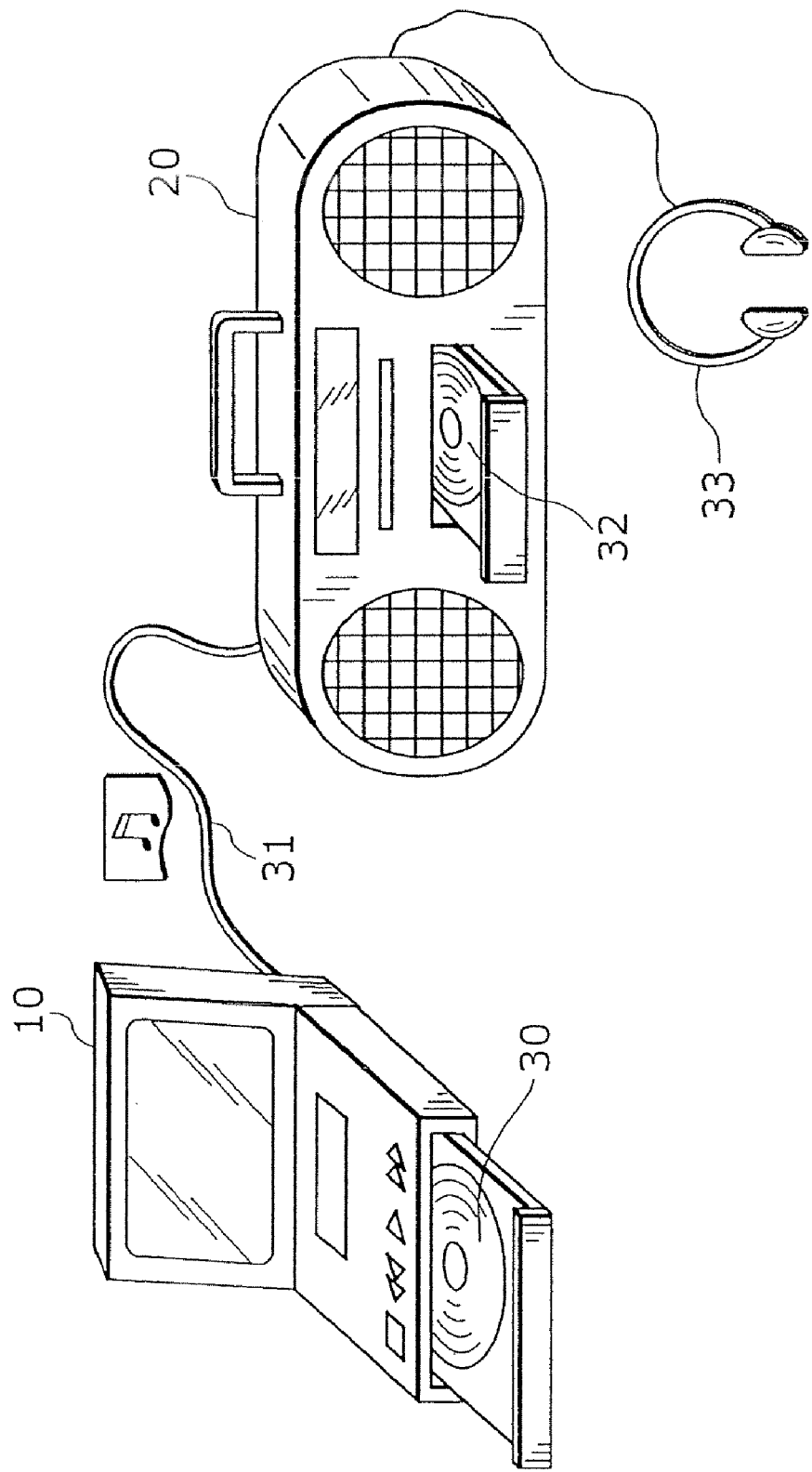
FIG. 1 is an external view of the content reproducing apparatus and the content recording apparatus according to the present invention.

FIG. 1 is an external view of the content reproducing apparatus 10 as an example of the content transmitting apparatus according to the present invention and the content recording apparatus 20 as an example of the content receiving apparatus according to the present invention. Here, the appearance in which the content reproducing apparatus 10 and the content recording apparatus 20 are connected by a High-Definition Multimedia Interface (HDMI) cable 31 is shown.

The content reproducing apparatus 10 is a DVD player and the like. Here, the content reproducing apparatus 10 reproduces the music content recorded into the DVD 30, and digitally outputs the music content to the content recording apparatus 20 via the HDMI cable 31.

The content recording apparatus 20 is a CD recorder and player including a recording and reproducing function, and the like. And, the content recording apparatus 20 (i) records, into a CD 32, the music content transmitted via the HDMI cable 31, (ii) reproduces the recorded music content, and (iii) audio outputs the music content to the head phone 33.

Hereinafter, according to the present embodiment, an example of the case where the music content is copied from the DVD 30 attached to the content reproducing apparatus 10 to the CD 32 attached to the content recording apparatus 20 will be explained.

Figure 2:
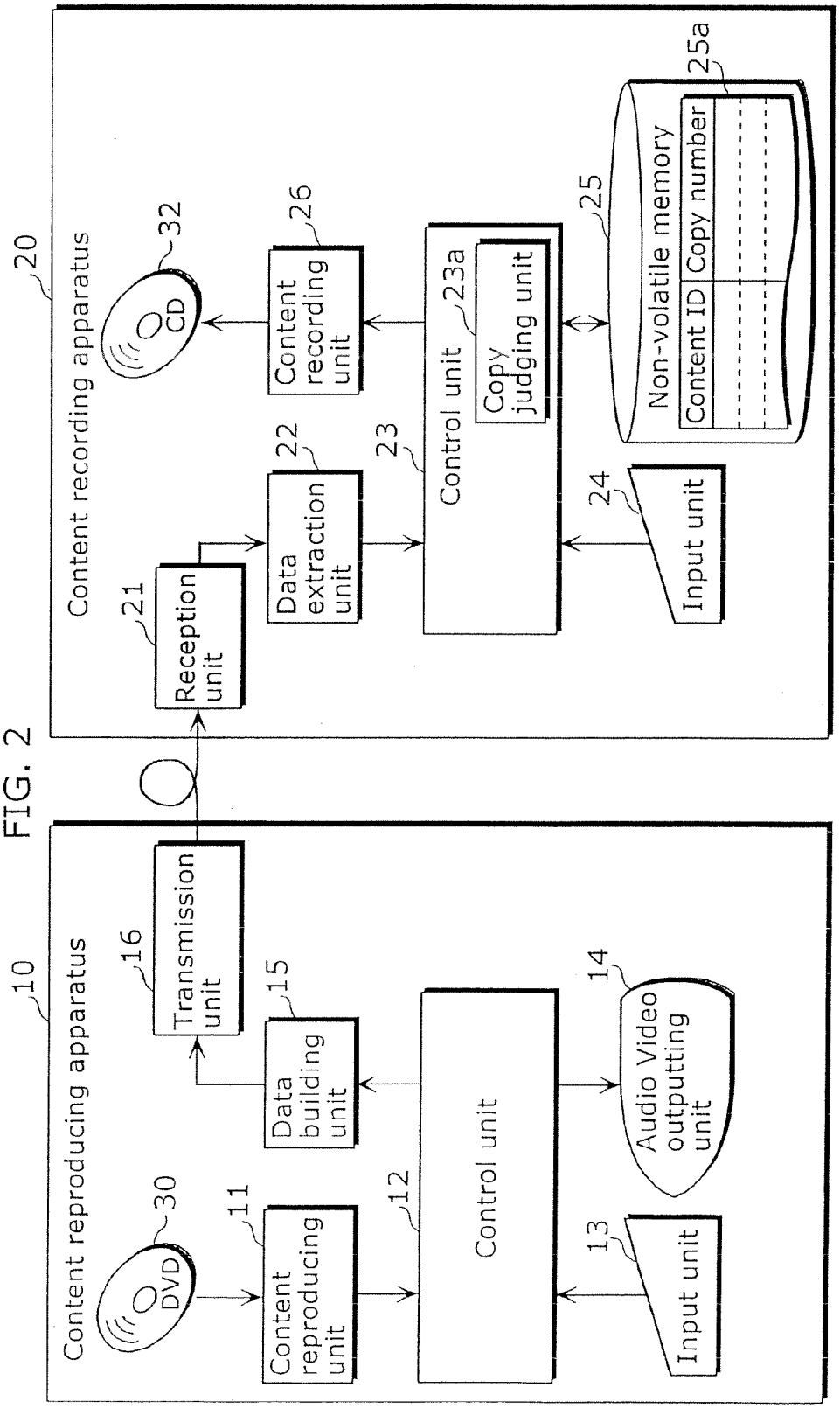
FIG. 2 is a functional block diagram showing the configurations of the content reproducing apparatus and the content recording apparatus as shown in FIG. 1.

FIG. 2 is a functional block diagram showing the configurations of the content reproducing apparatus 10 and the content recording apparatus 20 as shown in FIG. 1. Although the content recording apparatus 20 includes functions of recording and reproducing content, only the configuration elements involved in recording are shown in FIG. 2.

The content reproducing apparatus 10 is a DVD player and the like which include a function of digitally outputting the content read out from a DVD 30, via the HDMI cable 31. And, the content reproducing apparatus 10 includes: a content reproducing unit 11, a control unit 12, an input unit 13, a video audio output unit 14, a data building unit 15 and a transmission unit 16. In the DVD 30, for example, music content is recorded according to the DVD-Audio standard, and each song is formed by groups of fixed-length packet data (that is, content block).

The content reproducing unit 11 is an optical head, a demodulator circuit, a decoding processing unit and the like which read out the content such as music recorded in the attached DVD 30. The information read out by the content reproducing unit 11 is not only the content, but also information accompanying the content such as the control packet as shown in FIG. 3.

Figure 3:
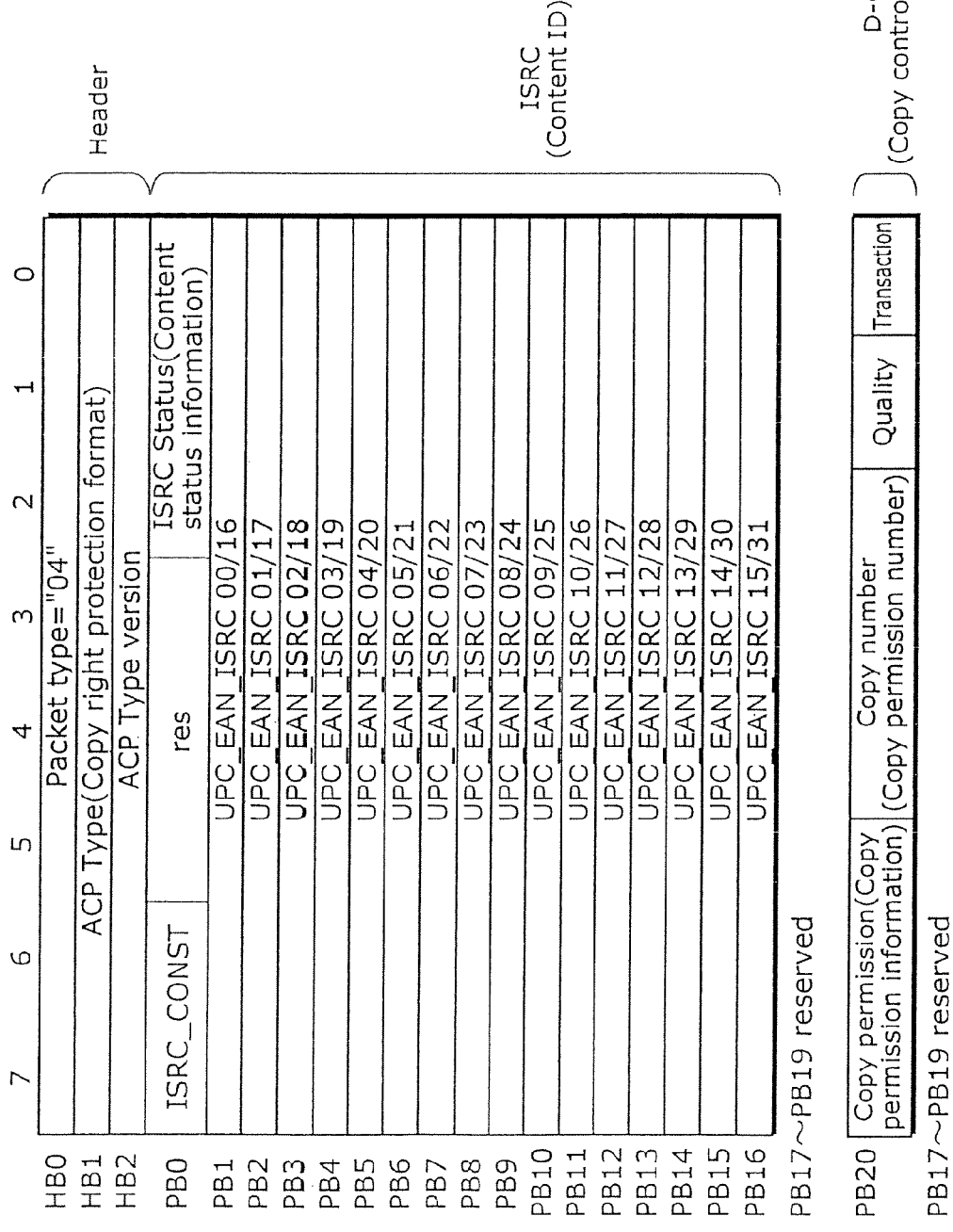
FIG. 3 is a diagram showing the structure of a control packet for music content recorded in a DVD.

FIG. 3 is a diagram showing the structure of a control packet for music content recorded in the DVD 30. The above mentioned control packet is, for example, control information of 24 bytes placed in the header unit and the like of the plurality of packets included in the content. The meaning of each control information is as follows.

Packet type: indicates the type of the control packet;

ACP Type and ACP Type version: indicate the employed copy right protection format;

International Standard Recording Code (ISRC)_CONST (2 bits): indicates that the following 16-byte PB1-PB16 are respectively one of "first half", "end half", "first half, but 16 bytes of the end half are all zero" or "null" of the content ID (32-byte content identification information);

res: indicates the area (reservation) reserved for future use;

ISRC Status (Content status information): indicates the position (one of "head part", "central part" and "end part"), in the overall content (for example, one song), of the content data corresponding to the control packet, said ISRC Status set in advance so that, for example, in the case of a song with 5-minute performance time, (i) the content status information corresponding to the content data of the head to 10 seconds indicates "head part", (ii) the content status information corresponding to the content data of the following 4 minutes and 40 seconds indicates "central part", and (iii) the content status information corresponding to the content data of the last 10 seconds indicates "end part";

Universal Product Code (UPC)_European Article Number (EAN)_ISRC 00/16-15/31: indicate the first-half 16 bytes (or the end-half 16 bytes) included in the content ID;

Copy_permission (Copy permission information): indicates one of "unlimited", "copy permitted only for one generation", "prohibited" and the like;

Copy number (Copy permission number): indicates the content copy number permitted only in the case where the Copy_permission indicates "copy permitted only for one generation";

Quality: indicates the quality (the upper limit of the sampling speed, and the like) permitted when copying; and Transaction: indicates the transaction permitted when copying.

The 24th byte PB0 is called "Copy Control Information (CCI)".

The control unit 12 is a CPU, a control circuit and the like which execute control, based on the user's direction from the input unit 13 and the like, by means of (i) Digital-to-Analog (D/A) converting the content read out by the content reproducing unit 11 into a video audio signal, and outputting the video audio signal to the audio video outputting unit 14, and (ii) outputting the above mentioned content, as digital data, to the outside via the data building unit 15 and the transmission unit 16.

The input unit 13 is a button, a key and the like for obtaining a direction from the user.

The audio video outputting unit 14 is a Liquid Crystal Display (LCD), a speaker and the like.

The data building unit 15, in digitally outputting content, based on the direction and data from the control unit 12, so as to synchronous transmit the content, copy control information, content ID and content status information, multiplexes the above mentioned information, and outputs such information to the transmission unit 16. Thus, when a content packet is digitally outputted, the copy control information, content ID and content status information corresponding to the packet are simultaneously outputted (time-division multiplexed). Also, in order to synchronize the above mentioned content, copy control information, content ID and content status information, the data building unit 15 includes the function of delaying the content to transmit, if necessary.

The transmission unit 16 is a communication interface which outputs, via the HDMI cable 31, data such as the content received from the data building unit 15.

The content recording apparatus 20 is a music CD recorder and player, and the like which include the function of recording, via the HDMI cable 31, the content transmitted from the content reproducing apparatus 10 into the CD 32 under the copy control. And, the content recording apparatus 20 includes: a reception unit 21, a data extraction unit 22, a control unit 23, an input unit 24, a non-volatile memory 25 and a content recording unit 26.

The reception unit 21 is a communication interface which receives data such as the content transmitted via the HDMI cable 31, and outputs the data to the data extraction unit 22.

The data extraction unit 22 (i) demultiplexes the data transmitted from the reception unit 21, (ii) restores the demultiplexed data as the content, copy control information, content ID and content status information, and (iii) outputs the above mentioned information to the control unit 23.

The control unit 23 is a CPU, a control circuit and the like which execute control such as, based on the user's direction from the input unit 24 and the like, (i) transmitting, to the content recording unit 26, the digitally inputted content via the reception unit 21 and data extraction unit 22, under the copy control of the copy judging unit 23a, and (ii) causing the CD 32 to record the above mentioned content.

The copy judging unit 23a is a processing unit which judges copy permission of content based on the content, the content control information, and the like transmitted from the reception unit 21 and data extraction unit 22. For example, the copy judging unit 23a judges that copy is permitted (1) in the case where it is judged that as the later mentioned special reproduction, a complete content has not been transmitted, (2) in the case where the copy permission information included in the copy control information indicates "unlimited", and (3) in the case where the copy permission information indicates "copy permitted only for one generation", and the cumulative copy number of the content by the content recording apparatus 20 has not reached the copy permission number included in the copy control information.

The input unit 24 is a button, a key, and the like for obtaining the user's direction.

The non-volatile memory 25 is a rewritable and non-volatile memory which memorizes the copy number table 25a and the like. The copy number table 25a is a data table for recording, per content ID, the number of times (cumulative copy number) that the content recording apparatus 20 made copies in the past. And, the non-volatile memory 25 is updated and referred to by the control unit 23.

The content recording unit 26 is a modulation circuit, an optical head and the like which record, into the CD 32, the content and the like transmitted from the control unit 23.

Next, the copy operations of the content reproducing apparatus 10 and the content recording apparatus 20, according to the present embodiment, configured as above, will be explained.

Figure 4:
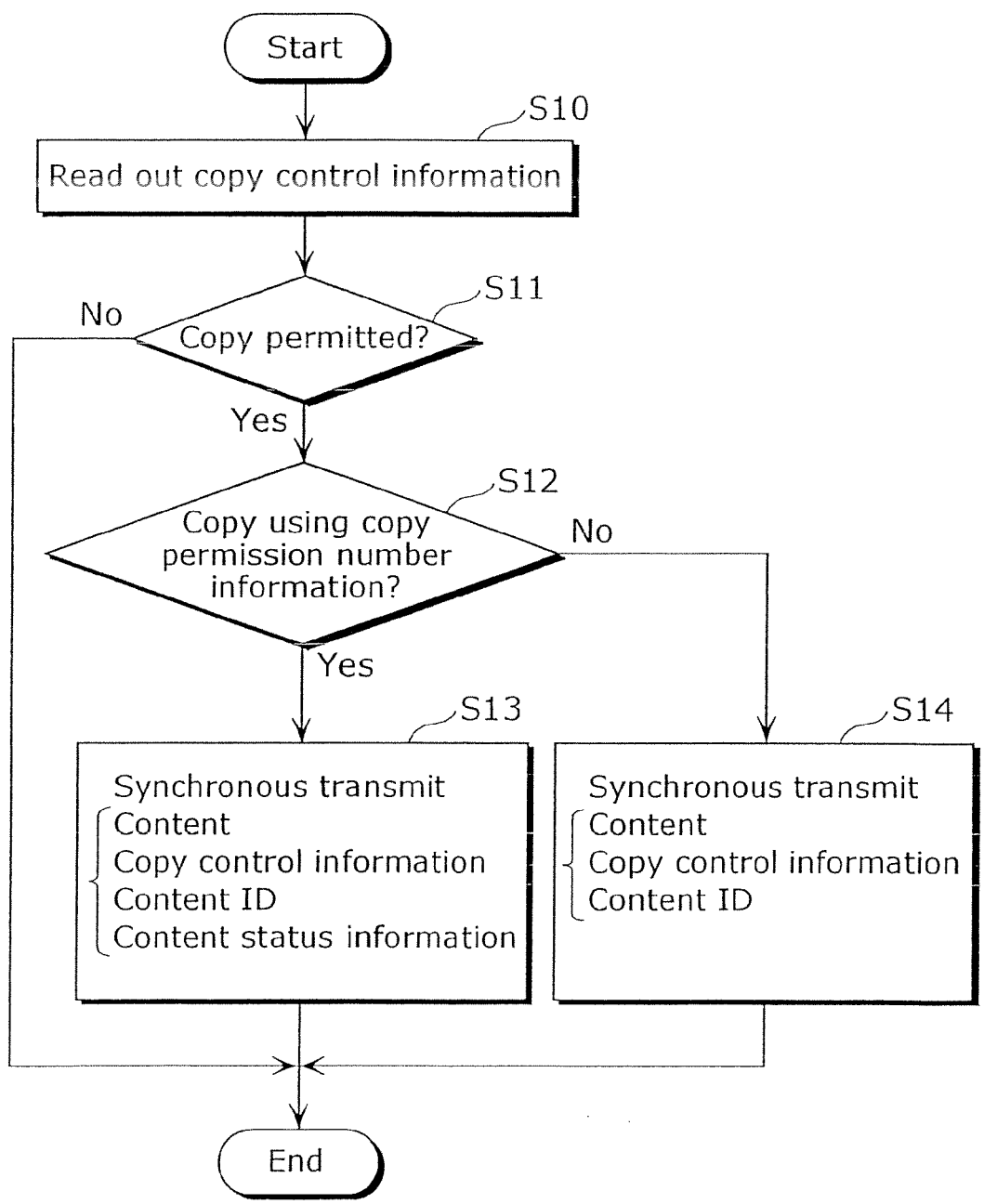
FIG. 4 is a flow chart showing the operational order of the content reproducing apparatus, focusing on the types of information read out from a DVD.

FIG. 4 is a flow chart showing the operational order of the content reproducing apparatus 10, focusing on the type of information read out from the DVD 30.

First, when the content to be copied is specified by the user's direction via the input unit 13 and the like, the control unit 12 reads out the head packet of the content via the content reproducing unit 11, and extracts the included copy control information (S10).

Then, the control unit 12 judges, based on the copy permission information included in the copy control information, whether copy is permitted or not, that is, whether the copy permission information indicates "unlimited" or "copy permitted only for one generation" (S11). As a result, in the case where copy is not permitted (No in S11), the copy process of the content is ended.

On the other hand, in the case where copy is permitted (Yes in S11), next, the control unit 12 judges whether or not the copy to be executed is the copy using the copy permission number information, that is, whether or not the copy permission information indicates "copy permitted only for one generation" (S12).

As a result, in the case where the copy to be executed is the copy using the copy permission number information (Yes in S12), the control unit 12, from the DVD 30, reads out the corresponding content, copy control information, content ID and content status information, and controls the content reproducing unit 11, the data building unit 15 and the like so as to cause the content recording apparatus 20 to synchronous transfer the above mentioned information (S13). On the other hand, in the case where the copy to be executed is not the copy using the copy permission number information (No in S12), the control unit 12, from the DVD 30, reads out the corresponding content, copy control information and content ID, and controls the content reproducing unit 11, the data building unit 15 and the like so as to cause the content recording apparatus 20 to synchronous transfer the above mentioned information (S14).

The above mentioned processes (S10-S14) are repeated for all of the packets included in one specified content.

In the above mentioned step S13, in the case where the copy using the copy permission number information is executed, the content status information is transmitted so that, as described later, the content recording apparatus 20 can confirm, based on the content status information, that one content (the amount of one copy) has been completely transferred.

Also, in parallel with the content transfer, the copy control information and content ID are repeatedly transmitted so that (i) the content recording apparatus 20 repeats judging the copy permission of the content per packet, and the security of the copy control can be enhanced, and (ii) by confirming that the content ID is identical in all of the packets included in one content, it can be found that one content has been certainly transferred.

Figure 5:
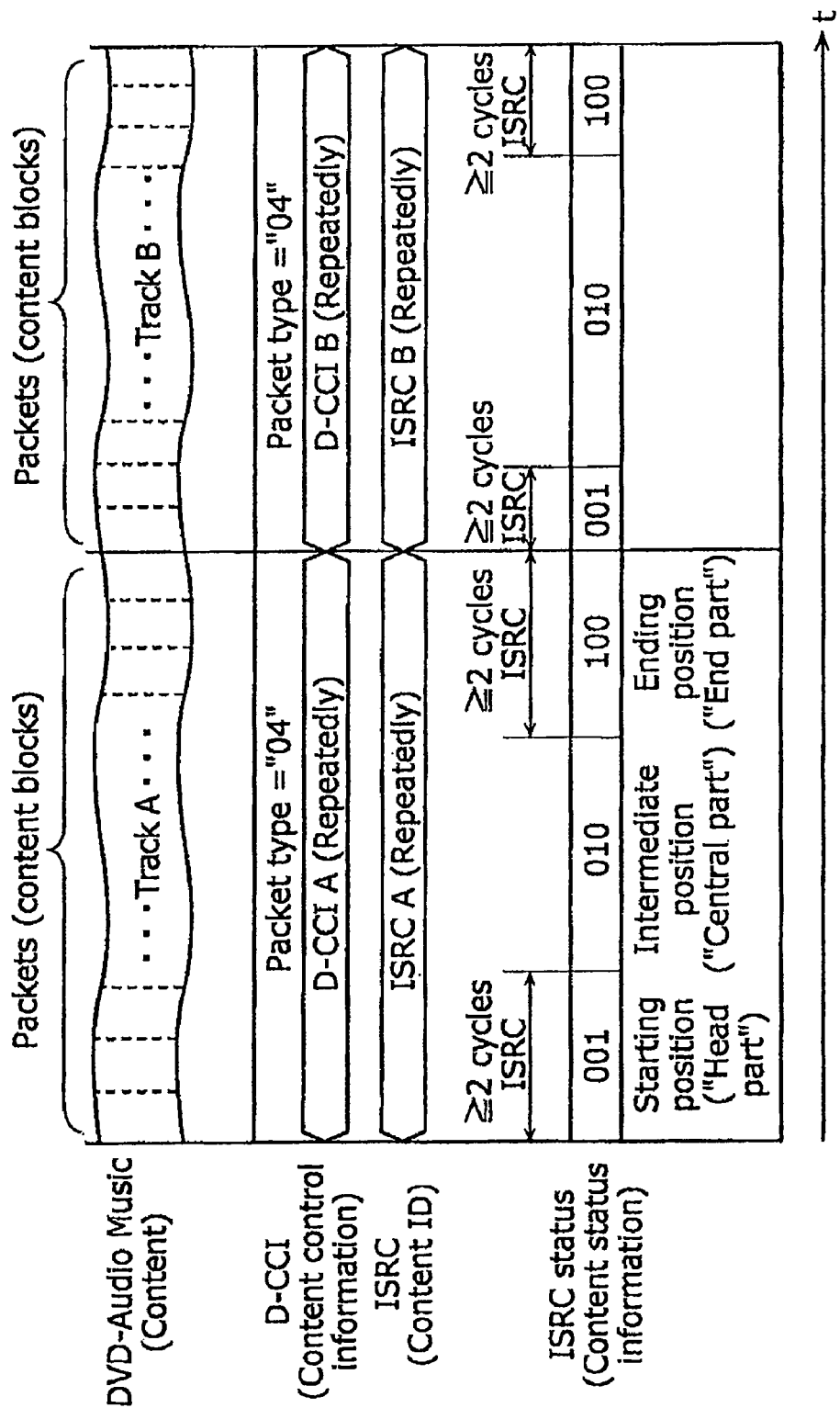
FIG. 5 is a diagram showing the temporal flow of information transferred from the content reproducing apparatus to the content recording apparatus.

FIG. 5 is a diagram showing the temporal flow of the information transferred from the content reproducing apparatus 10 to the content recording apparatus 20 in the content copy executed by the above mentioned repeated processes. Here, the case where the copy permission number information is necessary, that is, the condition in which the content status information is transferred along with the content and the like is shown.

As shown in FIG. 5, in the case where the content (song "Track A", "Track B" and the like) is copied and transferred, the copy control information, content ID and content status information corresponding to the packet of the transferred content are synchronous transferred. Focusing on the content status information, (i) when the head part of the song is transferred, the content status information indicating "head part" is transferred (here, transferred for two or more cycles), (ii) when the central part is transferred, the content status information indicating "central part" is transferred, and (iii) when the end part is transferred, the content status information indicating "end part" is transferred (here, transferred for two or more cycles). By confirming the above mentioned transfer of the content status information, the content recording apparatus 20 of the copy destination can confirm that one content (the amount of one copy) has been completely transferred.

Figure 6:
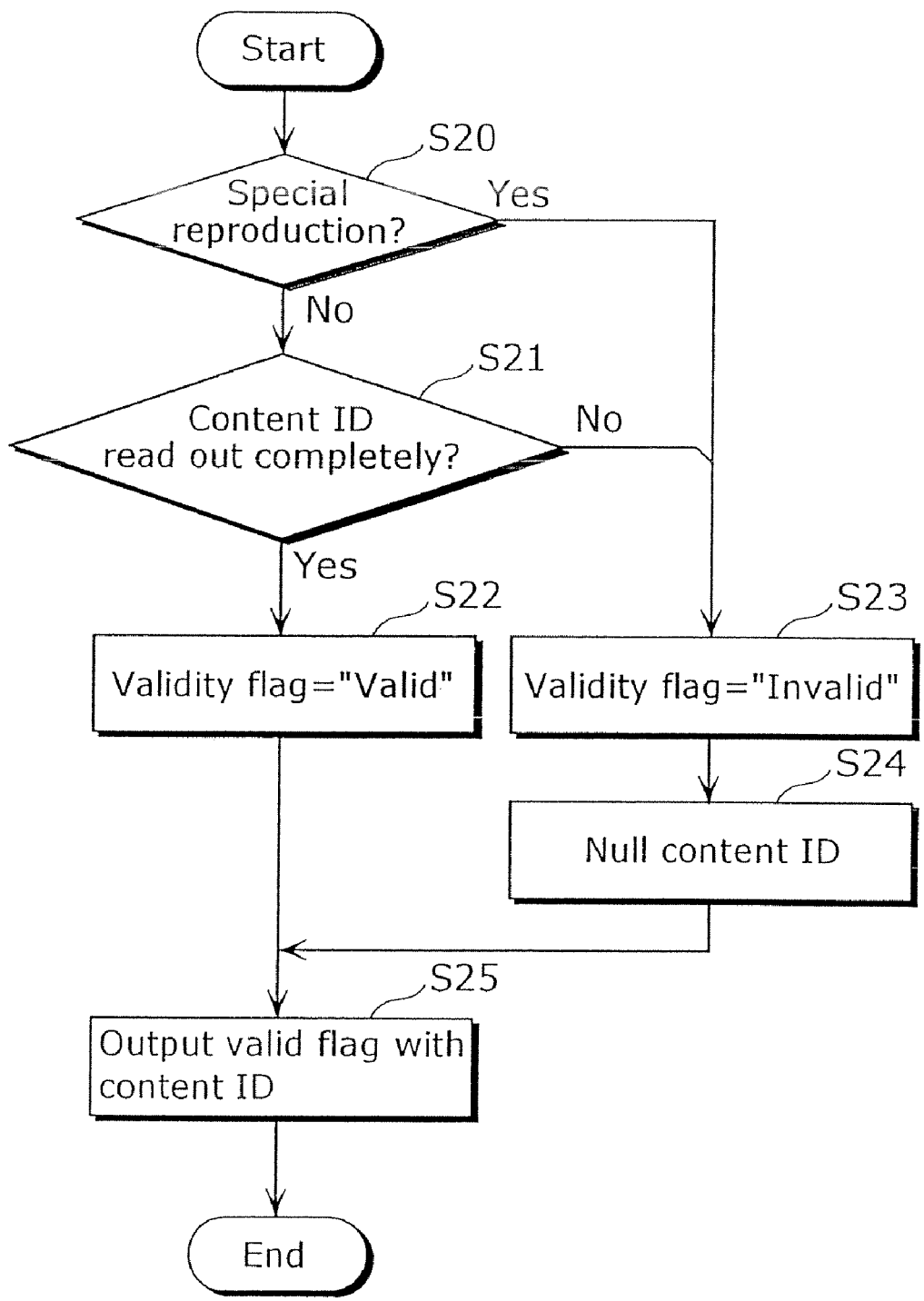
FIG. 6 is a flow chart showing the operational order of the content reproducing apparatus, focusing on the content ID transfer.

FIG. 6 is a flow chart showing the operational order of the content reproducing apparatus 10, focused on the content ID transfer. Here, the operational order of the content reproducing apparatus 10 which generates a flag indicating the validity of the content ID outputted when copying the content is shown.

First, the control unit 12, based on the user's direction and the like via the input unit 13, judges whether the content reproducing mode is special reproduction or regular reproduction (S20). Here, the special reproduction is, cue reproduction (fast forward direction), review reproduction (fast backward direction), slow (slow forward direction) and the like. And, the special reproduction is a reproduction mode which has no guarantee that the content ID of consecutive 16 bytes in the control packet is completely read out.

In the case where the reproduction mode is judged as the regular reproduction (No in S20), the control unit 12 judges whether the 16-byte content ID in the control packet has been completely read out by the content reproducing unit 11 (S21). Here, in the above mentioned judgment, for example, whether "ISRC_number" (the number indicating which of the 32 bytes in the content IDs the current byte is) recorded in each of the 16 bytes included in the content ID as shown in FIG. 3 is consecutive or not is judged.

As a result, in the case where the content ID has been completely read out (Yes in S21), the validity flag indicating the fact ("valid") is generated (S22), and outputted, along with the read-out content ID, to the content recording apparatus 20 (S25).

On the other hand, in the case where the reproduction mode is special reproduction (Yes in S20), and in the case where the content ID has not been completely read out (No in S21), (i) the validity flag indicating the fact ("invalid") is generated (S23), (ii) null (for example, filled with zero or null) content ID is generated (S24), and (iii) the validity flag is outputted with the content ID to the content recording apparatus 20 (S25).

As described above, when copying content, by outputting the validity flag indicating not only the content ID, but also the validity of the content ID to the content recording apparatus 20 of the copy destination, the content recording apparatus 20 can be immediately informed only by the value of the validity flag that the copy control is unnecessary. In other words, the content recording apparatus 20 can be immediately informed, for example, that the content has not been completely read out due to a special reproduction and the like, and the copy is permitted.

Figure 7:
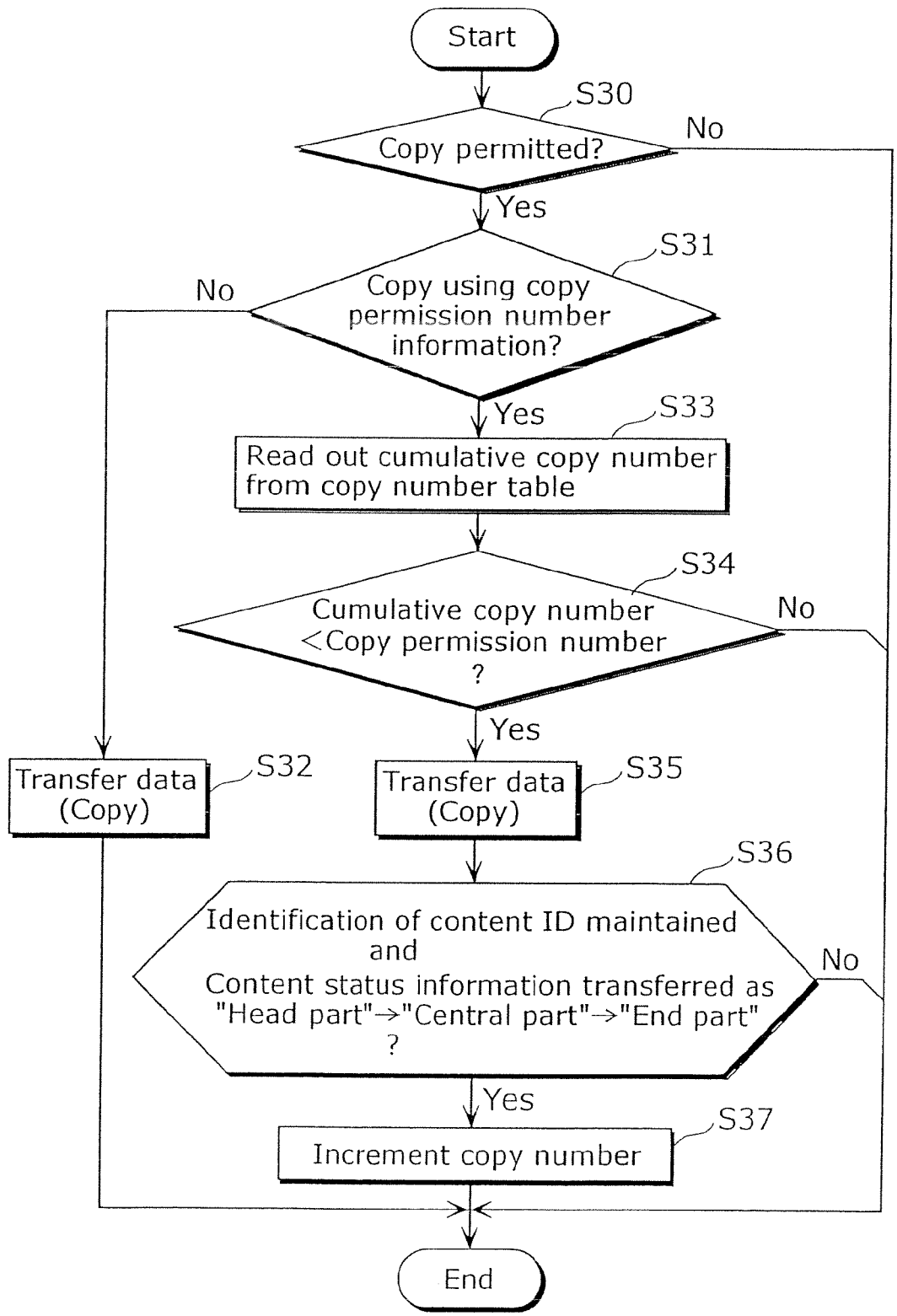
FIG. 7 is a flow chart showing the operational order of the content recording apparatus.

FIG. 7 is a flow chart showing the operational order of the content recording apparatus 20.

When copy starts and content is transmitted from the content reproducing apparatus 10 to the content recording apparatus 20, the copy judging unit 23a of the content recording apparatus 20 judges whether or not the transmitted content copy is the permitted one (S30). For example, the copy judging unit 23a of the content recording apparatus 20 judges that the copy is permitted in the case where (1) the copy permission information included in the synchronous transmitted copy control information indicates "no limit" or "copy permitted only for one generation", or (2) the validity flag of the content ID indicates "invalid".

As a result, in the case where the copy is not permitted (No in S30), the operation ends without writing the content into CD32.

On the other hand, in the case where the copy is permitted (Yes in S30), the copy judging unit 23a judges whether or not the copy to be made is the copy using the copy permission number information, that is, the copy permission information indicates "copy permitted only for one generation" (S31).

As a result, in the case where the copy to be made is not the copy using the copy permission number information (No in S31), the copy judging unit 23a judges that the copy to be made is the copy whose copy number needs not be managed, and executes control so that the received content should be written into the CD32 via the content recording unit 26 (S32).

On the other hand, in the case where the copy to be made is the copy using the copy permission number information (Yes in S31), the copy judging unit 23a reads out the copy number information corresponding to the content ID received in synchronization with the content from the copy number table 25a stored in the non-volatile memory 25 (S33).

Then, by comparing the cumulative copy number indicated by the read-out copy number information and the copy permission number included in the copy control information, whether or not the cumulative copy number reaches the copy permission number is judged (S34).

As a result, in the case where the cumulative copy number reaches the copy permission number (No in S34), the copy judging unit 23a ends the operation without writing the content into the CD32.

On the other hand, in the case where the cumulative copy number does not reach the copy permission number (Yes in S34), the copy judging unit 23a executes control so that the content is written into the CD32 via the content recording unit 26 (S35).

Then, the copy judging unit 23a repeats the above mentioned processes on all of the packets included in one content, and monitors the identification of the content ID and the transfer of the content status information included in the copy control information. Thus, the copy judging unit 23a judges whether or not (1) the content ID is always identical in copying one content, and (2) the content status information has been transferred from "head part" to "central part", then to "end part" (S36).

As a result, only in the case where the content ID is always identical, and the content status information has been transferred from "head part" to "central part", then to "end part" (Yes in S36), the copy judging unit 23a judges that one content (for example, one song) has been completely copied, and increments the copy number, by one, corresponding to the content ID in the copy number table 25a and updates the copy number (S37).

The above mentioned processes (S30-S37) are repeated for all of the packets included in one content. However, incrementing the copy number (S37) is executed only once for one copy of one content.

As described above, the content recording apparatus 20 executes copy control based on the copy control information for all of the packets included in one content. And, the copy whose copy permission number is predetermined is counted as one copy in the case where the identification of the content ID is held, and all of the "head part", "central part", and "end part" have been transferred.

Thus, in one content transfer, the copy control information is repeatedly transferred in synchronization with the content packet, and checked. Thereby, the guard function against the unauthorized copy due to the capture and replacement of the copy control information is enhanced. And, only in the case where one content has been completely transferred, one copy is counted. Therefore, even in the case where the content transfer is interrupted, correct copy number control according to the situation can be executed.

As described above, the content reproducing apparatus and content recording apparatus according to the present invention are explained based on the embodiment. However, the present invention is not limited to such embodiment as described above.

For example, according to the present embodiment, the case where the music content is copied is explained. However, the present invention is not limited to the music content, and can be applied to video content, as well.

Also, the interface which connects the content reproducing apparatus 10 and the content recording apparatus 20 is not limited to the HDMI cable 31, and can be, for example, Institute of Electronic and Electronics Engineers (IEEE) 1394 and the like.

In addition, according to the present embodiment, the content status information, regardless of the content, is transmitted in synchronization with the corresponding content (packet). However, the content status information indicating at least the "head part" and the "end part" can be transmitted in synchronization with the corresponding content. Even in the case where the content status information indicating the "central part" is transmitted temporally misaligned with the corresponding content, as long as the "head part" and the "end part" are certainly confirmed, it can be confirmed that one content has been completely transferred.

Moreover, according to the present embodiment, in the copy number table 25a, pairs of the content ID and the cumulative copy number are recorded. However, the present invention is not limited to such recording method as described above, and for example, only the cumulative copy number can be recorded in the copy number table by associating the copy ID with the storage location.

Furthermore, according to the present embodiment, as an example of the control packet recorded in the DVD 30, the packet of the type "04" as shown in FIG. 3 is described. However, the present invention is not limited to the control packet of the above mentioned type, and for example, can be the control packet of the type "05" as shown in FIG. 8A and the control packet of the type "06" as shown in FIG. 8B.

In the second byte HB1 of the control packet of the type "05" as shown in FIG. 8A, "ISRC_CONST" is a flag indicating whether the "ISRC" is split transmitted by two packets or the "ISRC" is transmitted by one packet by compressing "0" indicating "reserved". In other words, when the "ISRC_CONST" is "1", it indicates that the "ISRC" of 32 bytes is formed by the two packets which are the current packet and the following packet of the type "06" (as shown in FIG. 8B). On the other hand, when the "ISRC_CONST" is "0", it indicates that "UPC_EAN_ISRC 16-31" is not transmitted (all of them have the default value "0"). Also, "ISRC_Valid" indicates whether or not "ISRC_Status" included in the packet and the data placed in "UPC_EAN_ISRC_xx" are valid, and is equivalent with the validity flag of the present embodiment.

Although only an exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

INDUSTRIAL APPLICABILITY

The present invention can be utilized as the content transmitting apparatus and content receiving apparatus used for copying digital contents such as video and music, for example, as the recorder and player for the recording media such as a DVD, a CD and an IC memory, in particular, as the content reproducing and recording apparatus and the like which execute copying while protecting the copy right of the digital copyrighted work.

The invention claimed is:

1. A content transmitting apparatus which transmits content of a first recording medium that is digital copyrighted work including a plurality of content blocks, the apparatus comprising:
 a transmission unit configured to transmit the content to an external apparatus, for each of the plurality of content blocks, and further transmit copy control information indicating copy permission of the content that corresponds to the content block that is being transmitted, content identification information identifying the content that corresponds to the content block that is being transmitted, and content status information that is position information for the content block that is being transmitted, the content status information indicating a position of the block in the content, wherein:
 the transmission unit is configured to:
  repeat transmitting the copy control information from a start of transmitting the content to an end of transmitting the content,
  repeat transmitting the content identification information from the start of transmitting the content to the end of transmitting the content,
  transmit (i) at least twice, content status information indicating that the content block that is being transmitted is located at a head part of the content, (ii) content status information indicating that the content block that is being transmitted is located at a central part of the content, and (iii) at least twice, content status information indicating that the content block that is being transmitted is located at an end part of the content, and
  include, when the content identification information is divided into first information and second information different from each other, flag information into the first information and transmit the second information after the first information, the flag information indicating that information related to the content identification information follows.

* * * * *